United States Patent
Barham et al.

(10) Patent No.: US 11,306,751 B2
(45) Date of Patent: Apr. 19, 2022

(54) APPARATUS AND METHODS FOR CONNECTING TUBES IN TRANSPORT STRUCTURES

(71) Applicant: DIVERGENT TECHNOLOGIES, INC., Los Angeles, CA (US)

(72) Inventors: Brian Md Barham, San Clemente, CA (US); Richard Winston Hoyle, Clarkston, MI (US); Antonio Bernerd Martinez, El Segundo, CA (US)

(73) Assignee: DIVERGENT TECHNOLOGIES, INC., Los Angeles, CA (US)

(*) Notice: Subject to any disclaimer, the term of this patent is extended or adjusted under 35 U.S.C. 154(b) by 1239 days.

(21) Appl. No.: 15/692,729

(22) Filed: Aug. 31, 2017

(65) Prior Publication Data

US 2019/0063476 A1    Feb. 28, 2019

(51) Int. Cl.
*F16B 2/14* (2006.01)
*F16B 7/04* (2006.01)
*B33Y 10/00* (2015.01)
*F16B 11/00* (2006.01)

(52) U.S. Cl.
CPC ............... *F16B 2/14* (2013.01); *B33Y 10/00* (2014.12); *F16B 7/044* (2013.01); *F16B 11/006* (2013.01)

(58) Field of Classification Search
CPC .......... F16B 11/006; F16B 7/044; B33Y 10/00
See application file for complete search history.

(56) References Cited

U.S. PATENT DOCUMENTS

| | | | |
|---|---|---|---|
| 4,925,142 A | 5/1990 | Farmer | |
| 5,203,226 A | 4/1993 | Hongou et al. | |
| 5,271,687 A * | 12/1993 | Holka | B62D 29/008 403/233 |
| 5,716,155 A * | 2/1998 | Yoshida | F16B 7/0446 403/187 |
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,247,869 B1 | 6/2001 | Lichvar | |
| 6,250,533 B1 | 6/2001 | Otterbein et al. | |

(Continued)

FOREIGN PATENT DOCUMENTS

JP        S5576913 U      5/1980
WO    1996036455 A1    11/1996

(Continued)

OTHER PUBLICATIONS

US 9,202,136 B2, 12/2015, Schmidt et al. (withdrawn)

(Continued)

*Primary Examiner* — Daniel J Wiley
(74) *Attorney, Agent, or Firm* — ArentFox Schiff LLP (57) ABSTRACT

Apparatus and methods for joining tubes in transport structures are presented herein. A part having an attached node with a socket can be joined with tubes. The tubes can be placed along nonparallel axes within the socket; and a wedge can be used to secure the tubes to the socket. The wedge can be secured between the tubes by using a fastener, such as a blind fastener; alternatively, or additionally, the wedge can be secured between the tubes using an adhesive.

34 Claims, 10 Drawing Sheets

(56) References Cited

U.S. PATENT DOCUMENTS

| | | |
|---|---|---|
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |

(56) References Cited

U.S. PATENT DOCUMENTS

| | | |
|---|---|---|
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |

(56) References Cited

U.S. PATENT DOCUMENTS

| | | |
|---|---|---|
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2001/0000119 A1 | 4/2001 | Jaekel et al. |
| 2005/0050730 A1 | 3/2005 | Marando et al. |
| 2006/0108783 A1 | 5/2006 | Ni et al. |
| 2010/0244497 A1 | 9/2010 | Honda et al. |
| 2012/0263521 A1* | 10/2012 | Auer ............... B62D 29/04 403/218 |
| 2014/0277669 A1 | 9/2014 | Nardi et al. |
| 2016/0016229 A1* | 1/2016 | Czinger ............... B22F 10/20 296/205 |
| 2017/0050677 A1 | 2/2017 | Czinger et al. |
| 2017/0113344 A1 | 4/2017 | Schönberg |
| 2017/0341309 A1 | 11/2017 | Piepenbrock et al. |

FOREIGN PATENT DOCUMENTS

| | | |
|---|---|---|
| WO | 1996036525 A1 | 11/1996 |
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Extended European Search Report received for corresponding European Application No. EP 18850009.4 dated Mar. 30, 2021.
International Search Report and Written Opinion dated Jan. 29, 2019, regarding PCT/US2018/044408.
First Amendment Notice dated Apr. 16, 2019, regarding China Application No. CN201821413921.0.

* cited by examiner

APPARATUS AND METHODS FOR CONNECTING TUBES IN TRANSPORT STRUCTURES

BACKGROUND

Field

The present disclosure relates generally to techniques for joining tubes to parts in transport structures, and more specifically to joining tubes to parts using additively manufactured parts and techniques.

Background

Recently three-dimensional (3D) printing, also referred to as additive manufacturing, has presented new opportunities to efficiently build automobiles and other transport structures such as airplanes, boats, motorcycles, and the like. Applying additive manufacturing processes to industries that produce these products has proven to produce a structurally more efficient transport structure. An automobile produced using 3D printed components can be made stronger, lighter, and consequently, more fuel efficient. Advantageously, 3D printing, as compared to traditional manufacturing processes, does not significantly contribute to the burning of fossil fuels; therefore, the 3D printing of parts for automobiles can be classified as a green technology.

Transport vehicles may require a chassis or frame including tubes, extrusions, panels, and the like; additionally, some of the parts may not have been previously available in traditional manufacturing processes. Thus, for this and a variety of reasons, conventional techniques for joining parts, such as welding, may not be a viable alternative for use with some of the new parts. Accordingly, there is a need to discover and develop new ways to join tubes in transport structures using additively manufactured parts and techniques.

SUMMARY

Several aspects of techniques for joining tubes to parts will be described more fully hereinafter with reference to three-dimensional (3D) printing techniques.

In one aspect an apparatus comprises a part, a node, and first and second tubes. The node comprises a first portion attached to the part and a second portion having a socket; and the first and second tubes extend from the socket along non-parallel axes.

The part can be additively manufactured. The node can be additively manufactured; and at least one of the first and second tubes can be additively manufactured. Additionally, the part can be an extrusion, and the extrusion can be hollow.

The apparatus can further comprise a wedge. The wedge can be between the first and second tubes to secure the first and second tubes to the socket. The wedge can be removable. The wedge can be additively manufactured. Also, the wedge can be tapered. At least one spacer can be inserted between the first and second tubes and the socket. The at least one spacer can separate a surface of the first and second tubes and a surface of the socket. The surface of the first and second tubes can be separated from the surface of the socket so as to reduce galvanic corrosion.

The wedge can comprise opposing concave surfaces. Each of the concave surfaces can be engaged with a different one of the first and second tubes. The wedge can be attached to the socket via an adhesive. The apparatus can comprise at least one seal, and the at least one seal can be configured to reduce galvanic corrosion. Additionally, the wedge can be attached to the socket via a fastener; and the fastener can be a blind fastener.

In another aspect a method of securing tubes to a part using a node having a socket comprises attaching the node to the part and inserting first and second tubes into the socket along nonparallel axis.

The part can be additively manufactured. Also, the part can be an extrusion, and the extrusion can be hollow.

At least one of the first and second tubes can be additively manufactured. Also, the node can be additively manufactured to extend from a surface of the part. Additionally, the surface can be flat.

The method can further comprise inserting a wedge between the first and second tubes to secure the first and second tubes to the socket. The wedge can be removable. The wedge can be additively manufactured. Also, the wedge can be tapered.

The method can comprise inserting at least one spacer between the first and second tubes and the socket. The at least one spacer can form a gap between a surface of the first and second tubes and a surface of the socket. The at least one spacer can form the gap between the surface of the first and second tubes and the surface of the socket so as to reduce galvanic corrosion.

Additionally, the wedge can comprise concave surfaces; and the step of inserting the first and second tubes into socket can comprise inserting the first tube between one of the concave surfaces and the socket. Also, the step of inserting the first and second tubes into the socket can comprise inserting the second tube between the other one of the concave surfaces and the socket.

The step of inserting the wedge can comprise securing the first and second tubes to the socket using an adhesive. Securing the first and second tubes to the socket using an adhesive can comprise forming at least one seal, and the at least one seal can reduce galvanic corrosion. The step of inserting the wedge can also comprise securing the first and second tubes to the socket using a fastener. Also, the fastener can be a blind fastener.

Different parts may be used that were not previously available for constructing frames and chassis in traditional manufacturing processes. It will be understood that other aspects of joining tubes to parts will become readily apparent to those skilled in the art from the following detailed description, wherein it is shown and described only several embodiments by way of illustration. As will be appreciated by those skilled in the art, the joining of tubes and parts using additively manufactured nodes, components, and/or parts can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatus and methods for joining tubes to extrusions will now be presented in the detailed description by way of example, and not by way of limitation, in the accompanying drawings, wherein.

DETAILED DESCRIPTION

The detailed description set forth below in connection with the drawings is intended to provide a description of exemplary embodiments of joining tubes to parts using additively manufacturing techniques, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of additive manufacturing in the context of joining two or more parts provides significant flexibility and cost saving benefits that enable manufacturers of mechanical structures and mechanized assemblies to manufacture parts with complex geometries at a lower cost to the consumer. The joining techniques described in the foregoing relate to a process for connecting additively manufactured (AM) parts and/or commercial off the shelf (COTS) components. Additively manufactured (AM) parts are printed three-dimensional (3D) parts that are printed by adding layer upon layer of a material based on a preprogrammed design; and COTS components may include aluminum manufactured extrusions and tubes. In the foregoing both COTS components and AM parts may be referred to simply as parts.

Parts described in the foregoing may include extrusions. Extrusions find use in many applications including automotive manufacturing applications. For instance, extrusions may be used in an automobile frame, roofing, and sunroof. A way to join additional parts, such as tubes, with an extrusion can include attaching, via an additively manufacturing technique, a node to the extrusion and then using a node socket for connecting the additional parts.

Additive manufacturing techniques can advantageously simplify the joining of different parts and/or components. Additive manufacturing also provides the ability to create complex structures within a part and to secure the part. For example, a node may be printed with a port or socket that enables the ability to secure two or more parts using non-traditional methods. Additionally, parts may be secured by injecting an adhesive rather than by welding them together, as is traditionally done in manufacturing complex products. Alternatively, and additionally, some components may be connected using a brazing slurry, a thermoplastic, or a thermoset, any of which can be used interchangeably in place of an adhesive. Thus, while welding techniques may be suitable with respect to certain additive manufacturing embodiments, additive manufacturing provides significant flexibility in enabling the use of alternative or additional connection techniques.

Accordingly, there is a need to develop non-traditional alternatives and additional connection techniques for both AM parts and COTS components, including tubes, nodes, and/or extrusions. It can be advantageous to develop new ways to join parts together during the manufacturing process; and joining tubes to parts may incorporate one or more factors such as materials, structure, design, and/or connecting features.

Apparatus and methods for joining tubes in transport structures are presented herein. A part having an attached node with a socket can be joined with tubes. The tubes can be placed along nonparallel axes within the socket; and a wedge can be used to secure the tubes to the socket. The wedge can be secured between the tubes by using a fastener, such as a blind fastener; alternatively, or additionally, the wedge can be secured between the tubes using an adhesive.

Figure 1A:
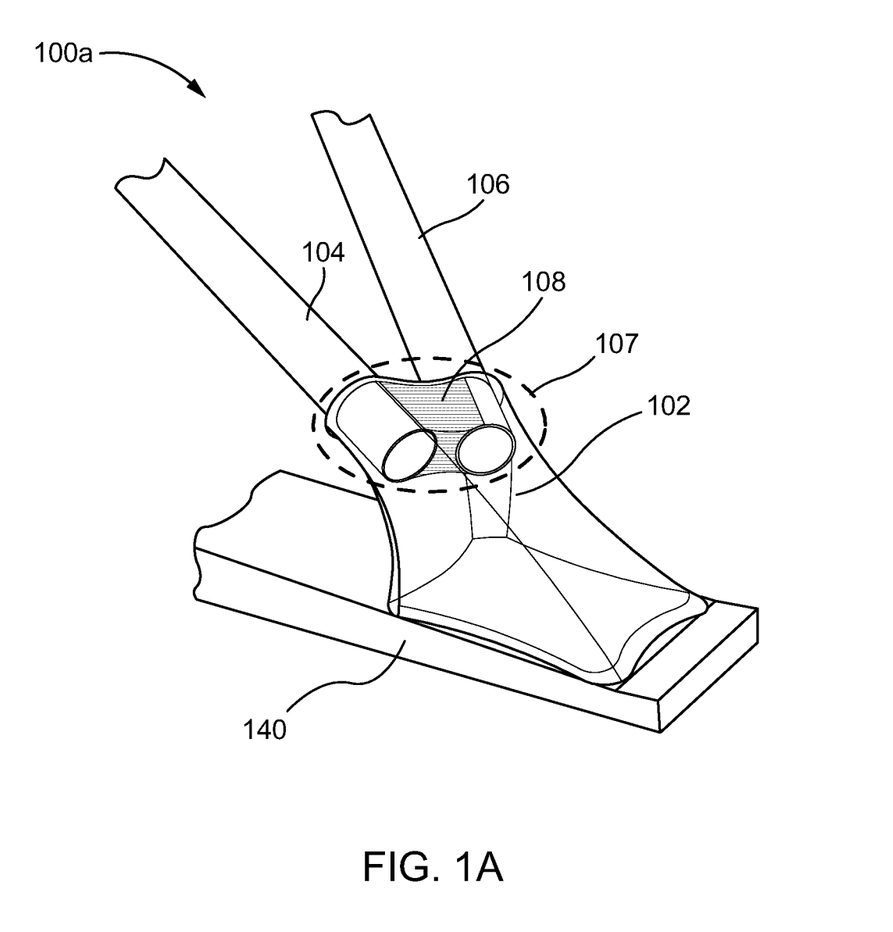
FIG. 1A illustrates a side perspective view of a tube to part connection according to an embodiment.

FIG. 1A illustrates a side perspective view 100a of a tube to part connection according to an embodiment. The side perspective view 100a shows a part 140, a node 102, a tube 104, a tube 106, and a wedge 108. The node 102 can be additively manufactured to have a node socket 107 and to extend from a flat surface of the part 140. Also, the part 140 can be a COTS component or an AM part; for instance, the part can be a panel section or frame component. As shown in FIG. 1 the tubes 104 and 106 can be inserted into the node socket 107 along non-parallel axes forming a vertex in the node socket 107. The wedge 108 can be placed between the tubes 104 and 106 to secure the tubes 104 and 106 into the node socket 107.

Although the side perspective view 100a shows part 140 as having a flat surface, other surface geometries are possible. For instance, the node 102 may extend from a non-flat and/or non-uniform surface of a part; thus, the concept of joining nodes to parts can apply to any part where a node and/or a node socket may be attached.

Figure 1B:
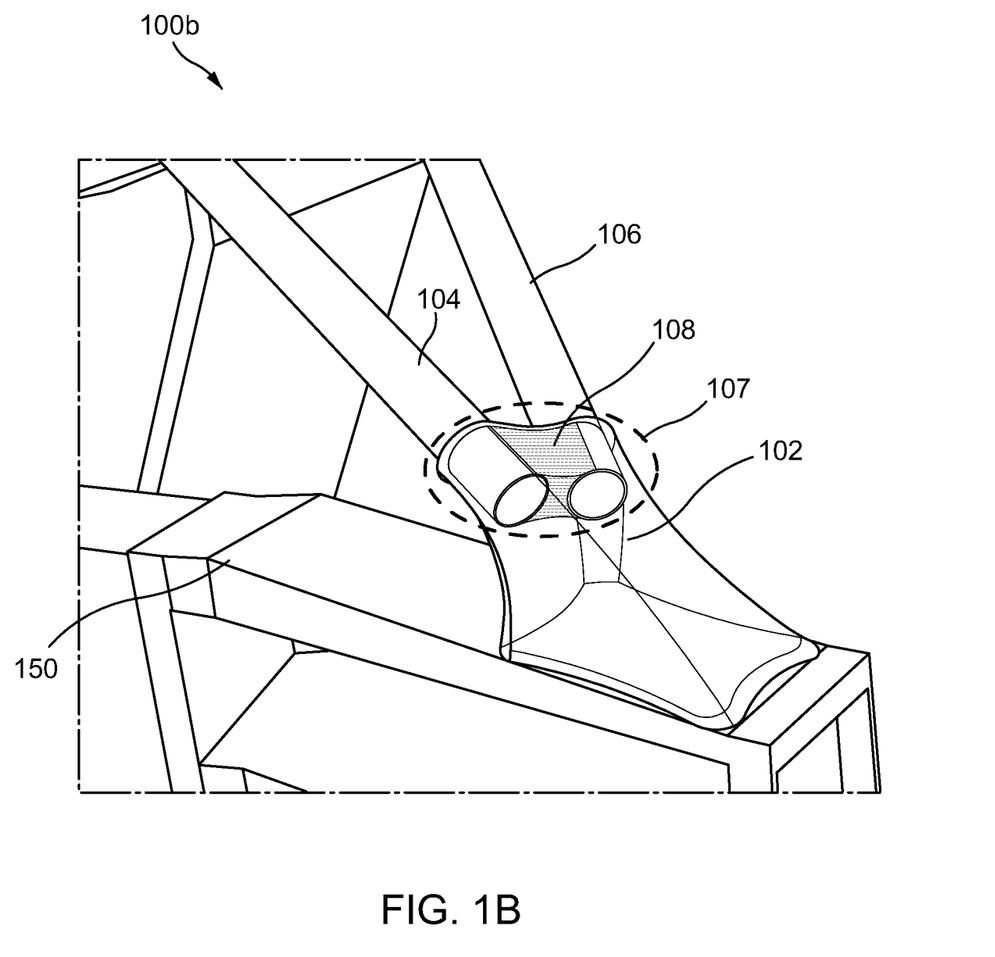
FIG. 1B illustrates a side perspective view of a tube to extrusion connection according to an embodiment.
Figure 5A:
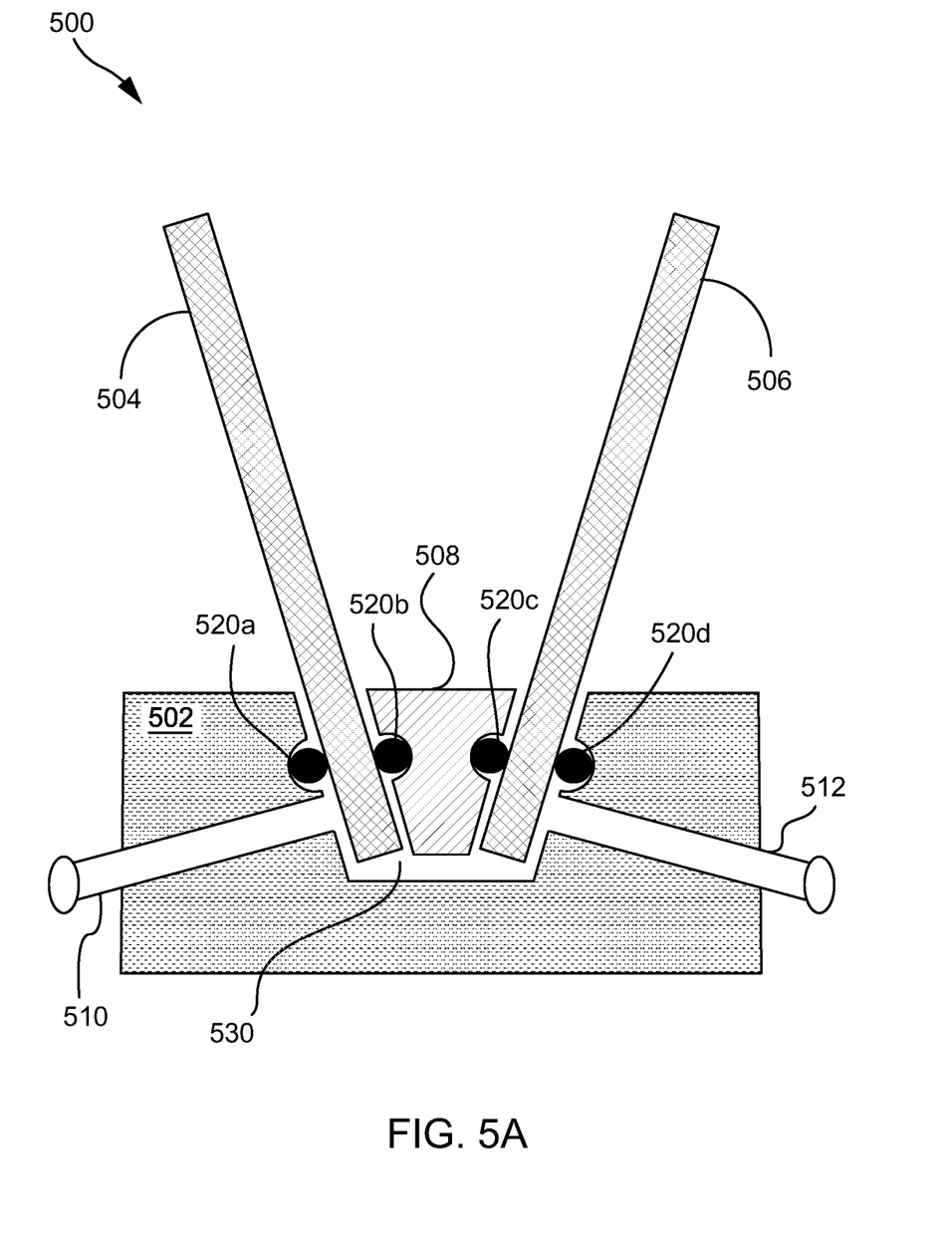
FIG. 5A illustrates a cross sectional view of a tube to part connection according to an embodiment.

Additionally, the wedge 108 can be attached to the node 102 and/or to the part 140 via a fastener (see FIG. 3) or with an adhesive (see FIG. 5). The fastener can be a blind fastener. Examples of blind fasteners can include, but are not limited to, aluminum/steel blind rivets, multi-grip rivets, dome-head rivets, and the like. In other embodiments the wedge 108 can be attached via a removable fastener (also not shown). A removable fastener can advantageously allow the convenient removal and repair of frame sections. FIG. 1B illustrates a side perspective view 100b of a tube to extrusion connection according to an embodiment. FIG. 1B can be an embodiment of the tube to part connection of FIG. 1A where the part 140 is replaced by an extrusion 150. As shown in FIG. 1B the extrusion 150 is a hollow-type extrusion; however, other types are possible. For instance, an extrusion can be flanged or can have a lattice interior instead of being hollow. Additionally, the node 102 can be additively manufactured to be extended from any type of extrusion surface, other than just from a flat surface. As one of ordinary skill in the art can appreciate, extrusions and/or nodes can be shaped and tailored for different applications including, but not limited to, transport vehicle frames, sunroofs, and front bumpers.

Additionally, some or all of the parts including the tubes 104 and 106, the extrusion 150, the node 102, and the wedge 108 can be additively manufactured (AM) parts. For instance, in one embodiment the node 102, the wedge 108, and the extrusion 150 can be AM parts while the tubes 104 and 106 can be COTS components.

Figure 2:
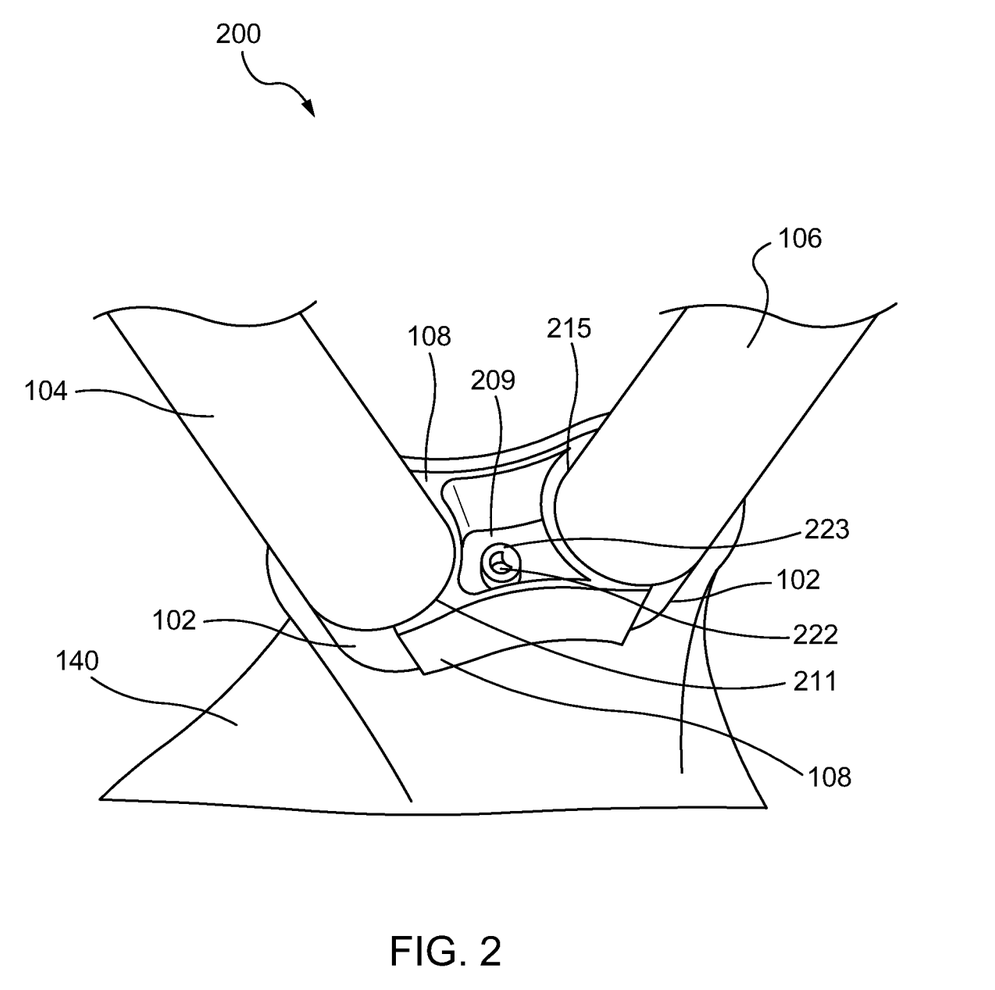
FIG. 2 illustrates a top perspective view of the tube to part connection according to the embodiment of FIG. 1A.

FIG. 2 illustrates a top perspective view 200 of the tube to part connection according to the embodiment of FIG. 1A. The top perspective view 200 provides a top perspective of the part 140, the node 102, the tube 104, the tube 106, and the wedge 108 of FIG. 1A. As shown in FIG. 2 the tubes 104 and 106 can be inserted into the node 102 along non-parallel axes at an angle. Also as shown the wedge 108 can be placed between the tubes 104 and 106. From the top perspective view 200 the wedge 108 is shown to have concave edge/surfaces 211 and 215 which surround portions of the tubes 104 and 106. For instance, the concave edge 211 with the node 102 completely surround tube 104, and the concave edge 215 with the node 102 completely surround tube 106. Additionally, the concave edges 211 and 215 can be tapered so as to act as clamps and/or collets surrounding the tubes 104 and 106.

In addition to having a collet feature, the wedge 108 is shown to have a top recessed feature 209. Within the recessed feature 209 there is an opening 223 which can accept a fastener 222. The fastener 222 may be used to fasten the wedge 108 to the node 102 so as to secure and/or clamp the tubes 104 and 106 within a socket of the node 102. An example of a fastener 222 can be a blind rivet which may be inserted through the opening 223 and secured to a lower portion of the node 102 (not shown). Alternatively, the fastener 222 can be a screw-type nut and bolt fastener which allows for easy removal. Having a removable fastener 222 can advantageously allow one to make repairs without having to replace or remanufacture parts.

Figure 3:
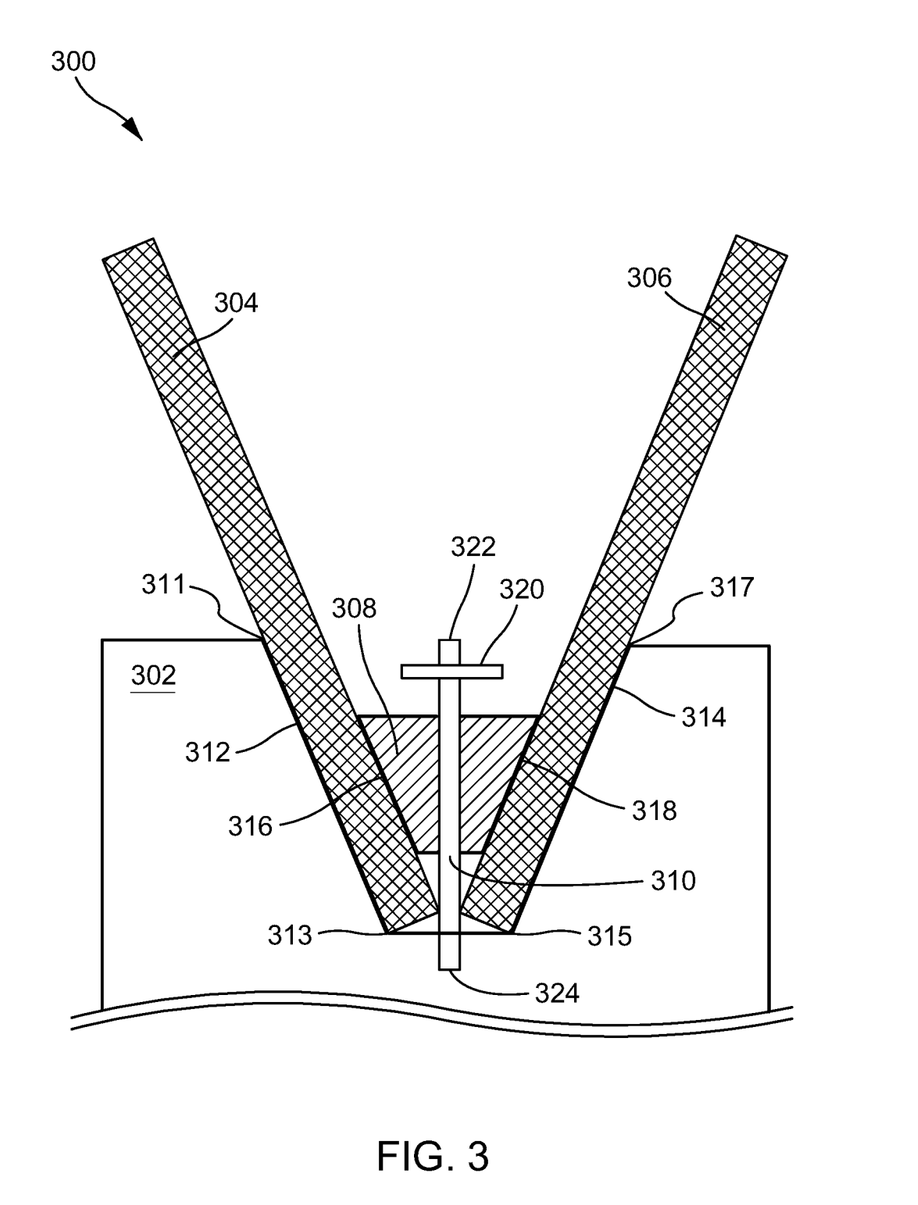
FIG. 3 illustrates a cross sectional view of a tube to part connection using a node according to an embodiment.

FIG. 3 illustrates a cross sectional view 300 of a tube to part connection using a node according to an embodiment. The cross sectional view 300 shows a node 302 having a node socket delineated by a socket edge 312 between socket vertices 311 and 313 and by a socket edge 314 between socket vertices 315 and 317. Although not shown in FIG. 3, the node socket can be extended from a part (not shown) to complete the tube to part connection.

As shown in the cross sectional view 300, a tube 304 and tube 306 are inserted within the node socket so that each has a surface in contact with an edge of the node socket. For instance, as shown in FIG. 3 the tube 304 has a surface in contact with the socket edge 312 and the tube 306 has a surface in contact with the socket edge 314. A wedge 308 is inserted so that a side 316 of the wedge contacts tube 304 and so that a side 318 of the wedge 308 contacts tube 306. The wedge 308 can have clamping or collet features which secure the tube 304 and the tube 306 within the node socket.

A fastener 310 may be used to fasten the wedge 308 to the node 302. The fastener 310 is shown to have a top 322, a bottom 324 and a bolt feature 320. Also, as shown the bottom 324 extends through the node socket into a solid portion of the node 302 so as to fasten the wedge 308 to the node 302. Additional fastener features are possible. For instance, the fastener can have rivet and clamping features. The fastener 310 can be a blind fastener and/or the fastener 310 can be a removable fastener.

Figure 4A:
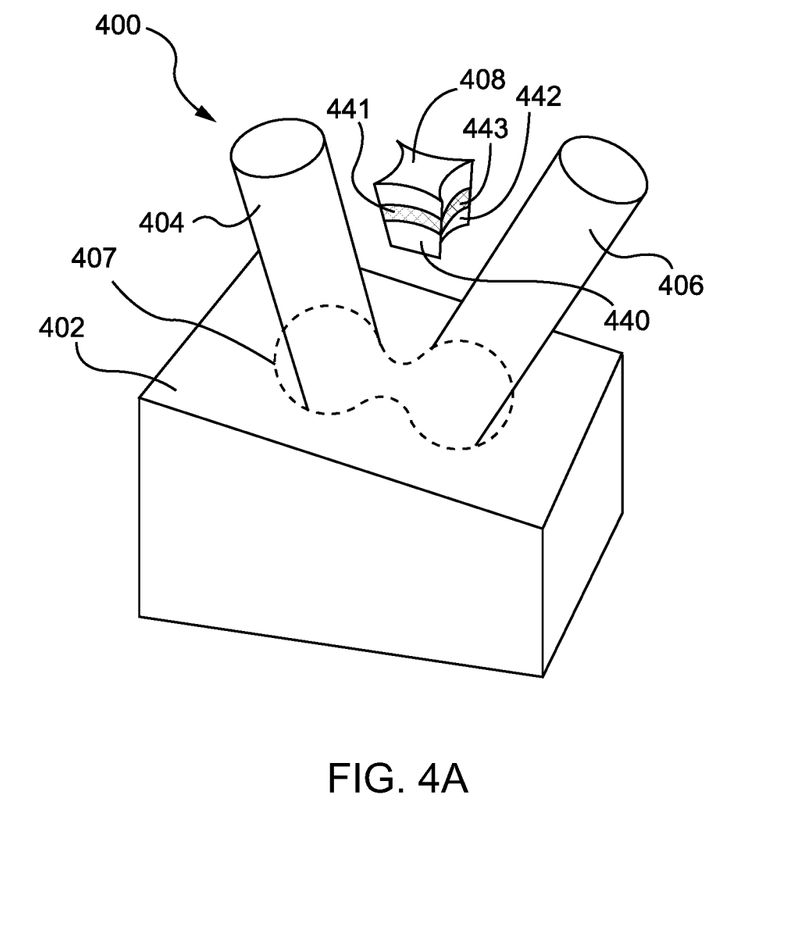
FIG. 4A illustrates a side perspective view of a tube and wedge placement into a node according to an embodiment.

FIG. 4A illustrates a side perspective view 400 of a tube and wedge placement into a node 402 according to an embodiment. The side perspective view 400 shows a tube 404, a tube 406, a wedge 408, and a node socket 407. Also as shown in FIG. 4, the wedge 408 has a side 440 with a seal groove 441 and a side 442 with a seal groove 443. The seal grooves 441 and 443 can advantageously receive a sealant, which in turn can be used to assist in applying and curing an adhesive. Although only two sides 440 and 442 are shown, there can be additional sides (not shown) to the wedge 408; and each additional side can also have a seal groove for accepting a sealant. In addition, as shown in FIGS. 4B and 4C, an additional seal groove may also be placed inside the node socket 407.

Figure 4B:
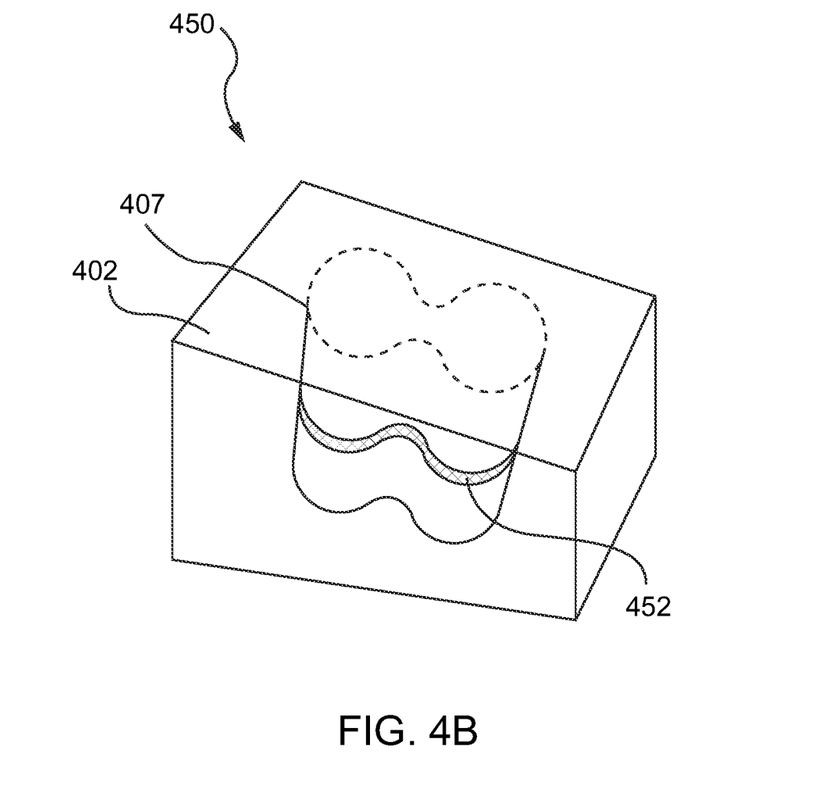
FIG. 4B illustrates a side perspective view of the node of FIG. 4A.
Figure 4C:
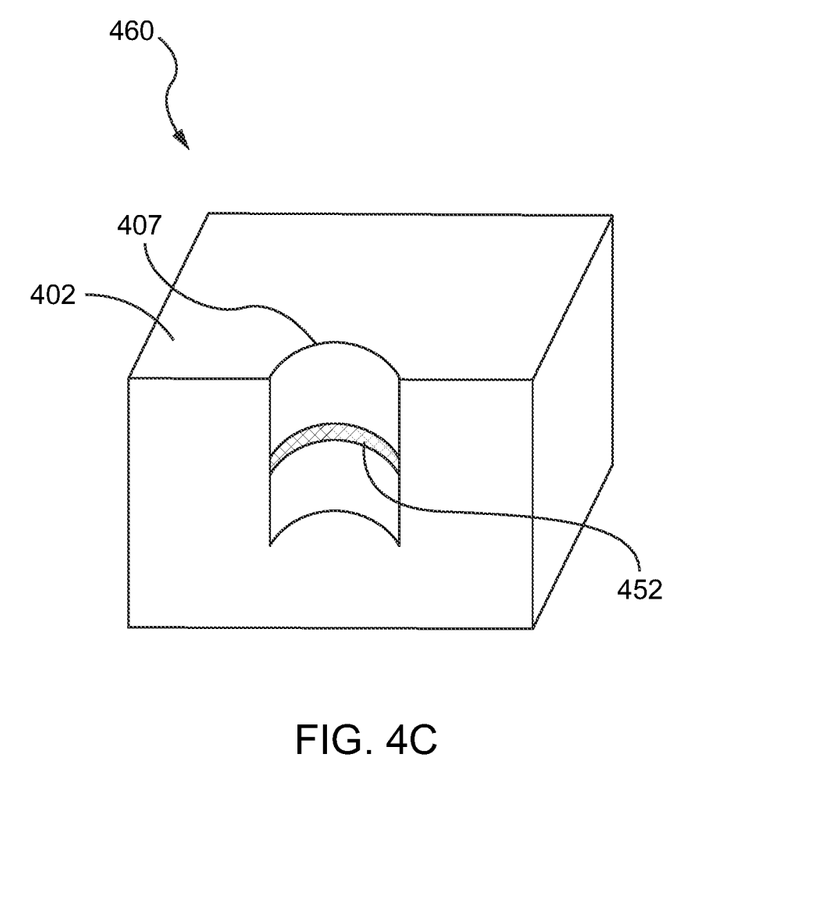
FIG. 4C illustrates a side cross-sectional view of the node of FIG. 4A.

FIG. 4B illustrates a side perspective view 450 of the node 402 of FIG. 4A; and FIG. 4C illustrates a side cross-sectional view 460 of the node of FIG. 4A. The side perspective view 450 and the side cross-sectional view 460 offer a below-the-surface view of the placement of a seal groove 452 within the node socket 407. Advantageously, the seal groove 452 can receive additional sealants to further improve the adhesive application.

Seals can advantageously improve a vacuum and enhance quality. For instance, a seal formed by sealants placed in seal grooves 441, 443, and 452 can be connected to a vacuum and evacuated; this in turn can enhance the drawing and injection of the adhesive when the adhesive is connected to an adhesive injector. The seals additionally can prevent galvanic corrosion between dissimilar materials by preventing surface to surface contact.

As shown in FIG. 4A, the tubes 404 and 406 can be placed inside the node socket 407 along non-parallel axes. The wedge 408 can be placed between the tubes 404 and 406 and can be secured with an adhesive; in this way the wedge can hold the tubes 404 and 406 within the node socket 407. The adhesive can be applied using vacuum and adhesive ports as shown in FIG. 5.

FIG. 5A illustrates a cross sectional view 500 of a tube to part connection according to an embodiment. The cross sectional view 500 shows a node socket 502, a tube 504, a tube 506, a wedge 508, an adhesive port 510, and a vacuum port 512. In addition the node socket 502 has seal grooves which are placed to form seals 520a and 520d, while the wedge has seal grooves which are placed to form seals 520b and 520c. Also, the node socket 502 can be attached to a part, such as part 140 of FIG. 1A.

In the embodiment of FIG. 5A an adhesive can be used to secure the wedge 508 between the tubes 504 and 506 within the node socket 502. An adhesive can be applied at the adhesive port 510. Next a vacuum can be applied at the vacuum port 512 to draw the adhesive into a fill region 530 formed between the tubes 504, 506, the wedge 508, and the node socket 502. The seals 520a-d can improve adhesive flow within the fill region 530 by sealing interfaces between the tubes 504, 506, the wedge 508, and the node socket 502. Once the seal region is completely filled with adhesive, the vacuum can be removed to allow the adhesive to cure.

Figure 5B:
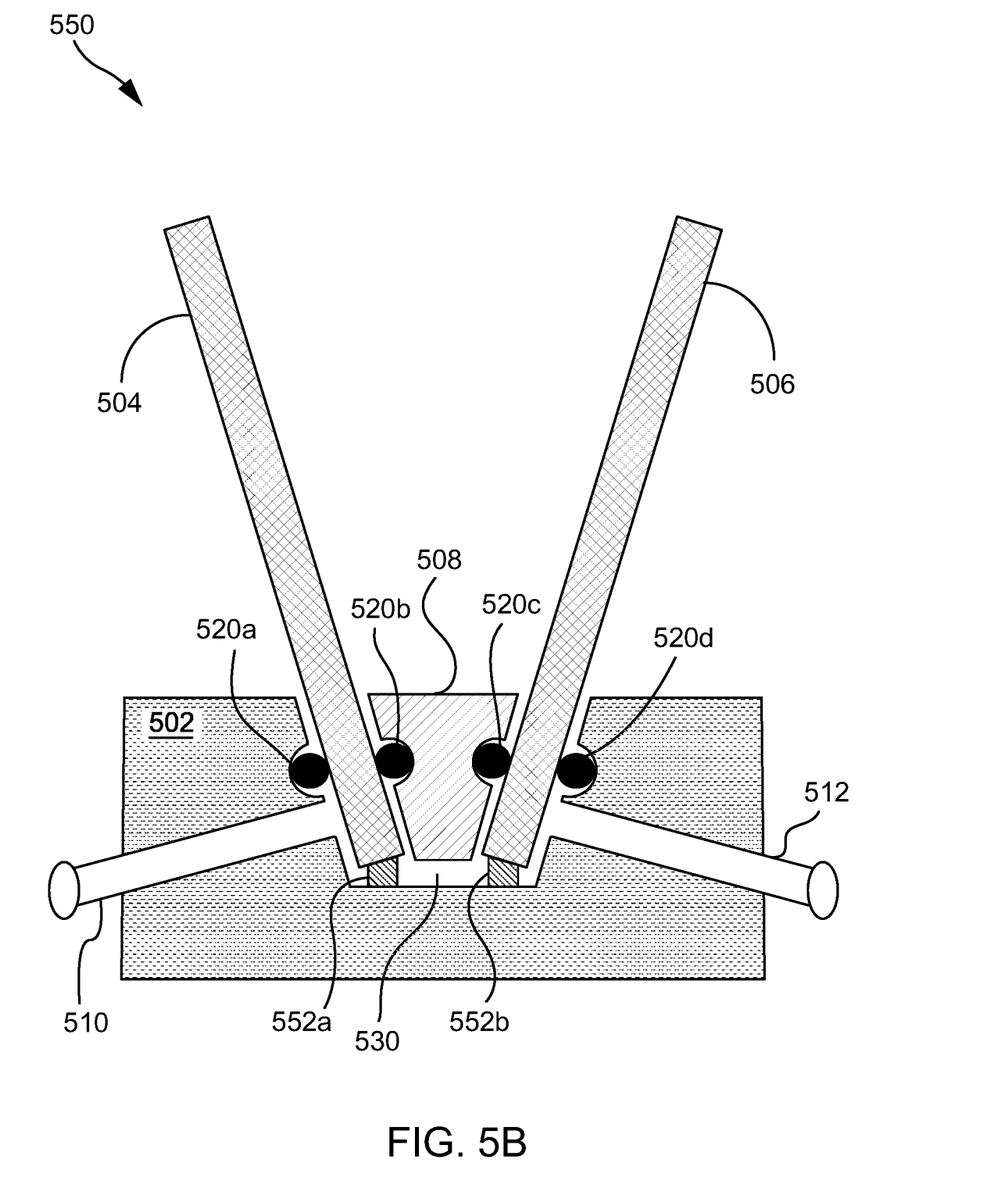
FIG. 5B illustrates a cross sectional view of a tube to part connection according to another embodiment.

FIG. 5B illustrates a cross sectional view 550 of a tube to part connection according to another embodiment. The embodiment as shown in the cross sectional view 550 is similar to the cross section view 500 of FIG. 5A; however, a spacer 552a is inserted between the tube 504 and the node socket 502, and a spacer 552b is inserted between the tube 506 and the node socket 502. The spacers 552a, 552b can advantageously separate the tubes 504, 506 from the node socket 502 and also prevent one or more surfaces of the tubes 504, 506 from contacting one or more surfaces of the node socket 502. In this way galvanic corrosion can be prevented and/or reduced.

Although FIG. 5B shows an embodiment having two spacers 552a, 552b, other configurations are possible. For instance, in other embodiments there can be greater or fewer spacers, and one or more spacers can additionally, and/or alternatively be placed between the wedge 508 and the tubes 504, 506. One or more spacers can be inserted at different locations; and the spacers, also referred to as spacer structures, can be configured to meet any design requirements of the tube to part connection. For example, spacer structures can create a variety of separation distances between surfaces. In various embodiments, spacer structures can create larger separation distances between surfaces in order to reduce or prevent a reaction. A larger separation distance may be helpful to reduce or prevent galvanic corrosion, particularly between surfaces that have different electrode potentials. Spacer structures can be made of a variety of materials, such as rubber, adhesive, plastic, metal, and the like. The material composition of a spacer structure can be designed to provide a particular benefit, such as providing flexibility of movement between surfaces, providing rigidity to reduce or prevent movement, making the surfaces resistant or waterproof, making the surfaces resistant to other substances, such as oil, grease, dirt, and the like. In various embodiments, the structural design and material composition of the spacer structure can provide a crush zone allowing a portion of crash energy to be dissipated in a controlled manner.

Figure 6:
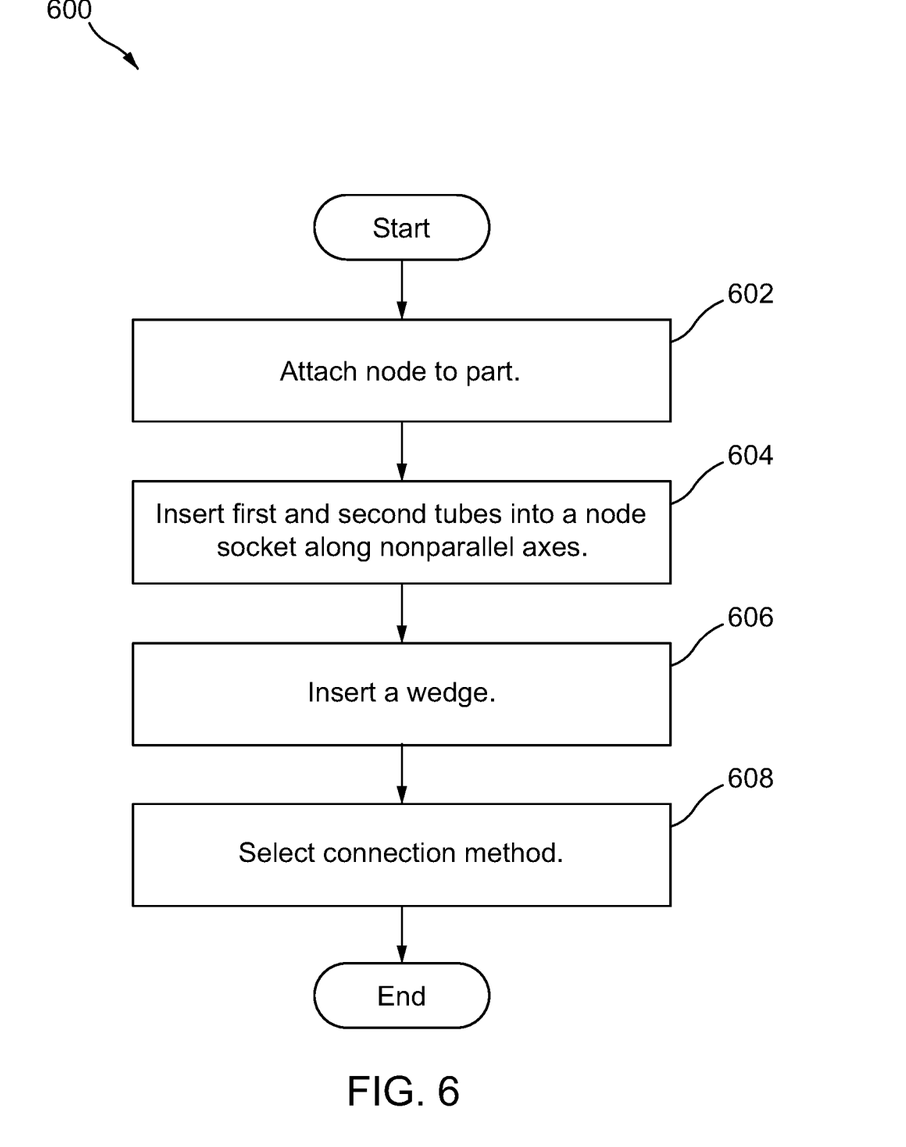
FIG. 6 conceptually illustrates a process for joining tubes with a part.

FIG. 6 conceptually illustrates a process 600 for joining tubes with a part. The process 600 includes process steps 602, 604, 606, and 608. Process step 602 relates to attaching a node to a part. The node can be attached with additive manufacturing, adhesive, and/or by traditional welding techniques. The node and the extrusion can be AM parts and/or COTS components as described above with respect to FIGS. 1A-5. Process step 604 relates to inserting tubes into a node socket as discussed above with respect to FIGS. 1A-5. For instance, process step 604 can refer to inserting tubes 104 and 106 into a node socket 107 as shown in FIG. 1A. The tubes can be AM parts and/or COTS components. The tubes can be inserted along non-parallel axes into the node socket. Next, process step 606 relates to inserting a wedge, such as wedge 108 of FIG. 1A. The wedge can be an additively manufactured wedge and/or a COTS wedge as described above. The wedge can be inserted to fit between surfaces and/or edges of the tubes 104 and 106 so as to clamp the tubes within a node socket. Process step 608 relates to selecting a connection method. In step 608 a fastener connection method can be selected whereby the wedge can be fastened to the node and/or to the part. When the wedge is fastened it can be fastened with a fastener such as fastener 310 of FIG. 3; the fastener can be a blind fastener and/or a removable fastener. Alternatively, an adhesive connection method can be selected; and the wedge and node can be configured as shown in FIGS. 4 and 5 for fastening with an adhesive.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing and joining tubes, nodes, and/or extrusions with various interconnects (interconnect units). Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
    a part;
    a node comprising a first portion attached to the part and a second portion having a socket;
    first and second tubes extending from the socket along non-parallel axes; and
    a wedge between the first and second tubes to secure the first and second tubes to the socket.

2. The apparatus of claim 1, wherein the part is additively manufactured.

3. The apparatus of claim 1, wherein the part is an extrusion.

4. The apparatus of claim 3, wherein the extrusion is hollow.

5. The apparatus of claim 1, wherein the node is additively manufactured.

6. The apparatus of claim 1, wherein at least one of the first and second tubes are additively manufactured.

7. The apparatus of claim 1, wherein the wedge is removable.

8. The apparatus of claim 1, wherein the wedge is additively manufactured.

9. The apparatus of claim 1, wherein the wedge is tapered.

10. The apparatus of claim 1, wherein the wedge comprises opposing concave surfaces, each of the concave surfaces being engaged with a different one of the first and second tubes.

11. The apparatus of claim 1, wherein at least one spacer is inserted between the first and second tubes and the socket, the at least one spacer separating a surface of the first and second tubes and a surface of the socket.

12. The apparatus of claim 11, wherein the surface of the first and second tubes is separated from the surface of the socket so as to reduce galvanic corrosion.

13. The apparatus of claim 1, wherein the wedge is attached to the socket via an adhesive.

14. The apparatus of claim 13, further comprising at least one seal, wherein the at least one seal is configured to reduce galvanic corrosion.

15. The apparatus of claim 1, wherein the wedge is attached to the socket via a fastener.

16. The apparatus of claim 15, wherein the fastener is a blind fastener.

17. A method of securing tubes to a part using a node having a socket, comprising:
    attaching the node to the part;
    inserting first and second tubes into the socket along nonparallel axis; and
    inserting a wedge between the first and second tubes to secure the first and second tubes to the socket.

18. The method of claim 17, wherein the part is additively manufactured.

19. The method of claim 17, wherein the part is an extrusion.

20. The method of claim 19, wherein the extrusion is hollow.

21. The method of claim 17, wherein at least one of the first and second tubes are additively manufactured.

22. The method of claim 17, wherein the node is additively manufactured to extend from a surface of the part.

23. The method of claim 22, wherein the surface is flat.

24. The method of claim 17, wherein the wedge is removable.

25. The method of claim 17, wherein the wedge is additively manufactured.

26. The method of claim 17, wherein the wedge is tapered.

27. The method of claim 17, further comprising inserting at least one spacer between the first and second tubes and the socket, the spacer forming a gap between a surface of the first and second tubes and a surface of the socket.

28. The method of claim 27, wherein the at least one spacer forms the gap between the surface of the first and second tubes and the surface of the socket so as to reduce galvanic corrosion.

29. The method of claim 17, wherein the wedge comprises concave surfaces, and wherein the inserting the first and second tubes into socket comprises:

inserting the first tube between one of the concave surfaces and the socket; and inserting the second tube between another one of the concave surfaces and the socket.

30. The method of claim 17, wherein the inserting the wedge comprises securing the first and second tubes to the socket using an adhesive.

31. The method of claim 30, wherein securing the first and second tubes to the socket using an adhesive comprises forming at least one seal.

32. The method of claim 31, wherein the at least one seal reduces galvanic corrosion.

33. The method of claim 17, wherein the inserting the wedge comprises securing the first and second tubes to the socket using a fastener.

34. The method of claim 33, wherein the fastener is a blind fastener.

* * * * *